May 18, 1965 G. L. SCHNABLE ETAL 3,184,399

ELECTROLYTIC ETCHING OF SEMICONDUCTORS
UTILIZING A.C. BIAS
Filed Sept. 23, 1960

INVENTORS
GEORGE L. SCHNABLE
JOHN G. JAVES
BY [signature]
AGENT 3,184,399

ELECTROLYTIC ETCHING OF SEMICONDUCTORS UTILIZING A.C. BIAS

George L. Schnable, Lansdale, and John G. Javes, North Wales, Pa., assignors, by mesne assignments, to Philco Corporation, Philadelphia, Pa., a corporation of Delaware Filed Sept. 23, 1960, Ser. No. 58,086
9 Claims. (Cl. 204—143)

This invention relates to methods useful in making semiconductor devices, and particularly to methods for the electrolytic etching of N-type semiconductive bodies.

In many processes including the fabrication of semiconductor devices such as transistors and high-frequency diodes it is important to provide rapid and smooth electrolytic etching of the semiconductive body, and in many cases it is also important that this etching action be localized with the best possible definition. Such etching is important for example in the fabrication of transistors of the type utilizing a pair of opposed depressions on opposite sides of a thin semiconductive wafer, such as the transistor shown and described in the U.S. Patent No. 2,885,571 of J. W. Tiley and R. A. Williams, issued May 5, 1959, and entitled "Semiconductor Device," and in the U.S. Patent No. 2,870,052 of A. D. Rittmann, issued January 20, 1959, and entitled "Semiconductive Device and Method for the Fabrication Thereof."

As is now well known, the rapid smooth etching of P-type semiconductive materials can be effected much more readily than similar etching of N-type semiconductive materials. This is for the reason that the electrolytic etching process requires the presence of a sufficient supply in the region to be etched of current-carriers known as "holes," which current-carriers are inherently present in large concentrations in P-type material but not in N-type material unless some special provision is made to create them. For this reason, in the etching of N-type semiconductive materials such as germanium and silicon it has become customary to create such "holes" in the material continuously during the etching, as by directing intense illumination upon the region to be electrolytically etched or by injecting "holes" into the semiconductor from a rectifying electrode on the side of the body opposite the surface to be etched. Both of these methods of supplying the necessary "holes" obviously introduce additional complications into the process. When intense illumination is used it is necessary to provide suitable strong sources of light mounted in such a manner as to focus the illumination upon the region to be rapidly etched, and to provide very accurate alignment of the illuminating structure with respect to the tiny semiconductive wafer in order to obtain best results. Injection of "holes" from a rectifying contact to the body on the opposite side of the wafer requires accurate location of the contact and the provision and maintenance of its rectifying properties during the process, as well as the provision and control of a separate potential applied to the contact, so as to provide the necessary "hole" concentration in the desired region. In addition, in some instances these methods of providing the necessary "holes" provide less precise definition of the extent of the etching action than is desired in certain cases.

It is therefore an object of my invention to provide an improved method for the rapid and smooth electrolytic etching of N-type semiconductive materials such as germanium and silicon.

It is a further object to provide such a process which is simpler and more economical of time and materials than previously known processes.

It is another object to provide an improved method for the rapid and smooth jet-electrolytic etching of N-type semiconductors without requiring the illumination previously utilized.

A further object is to provide such a process which produces improved definition of the extent of the etched region.

In accordance with the invention these objects are achieved by controlling the potential applied between the electrolyte and the N-type semiconductive body so that during successive intervals the electrolyte alternately injects "holes" into the semiconductive material and provides normal anodic etching of the semiconductor. For example an alternating potential may be applied between the semiconductive body and the applied electrolyte so that when the electrolyte is thereby made positive with respect to the semiconductive body "holes" are injected into the surface of the semiconductive body to be etched, and when the electrolyte is later made negative to the body rapid and smooth etching of the body occurs. While injection of "holes" ceases when the body is made positive to the electrolyte, in accordance with the invention a substantial fraction of those "holes" produced during the time interval in which the electrolyte was biased positively remain in the body for an appreciable time thereafter before they recombine with electrons and disappear. The average duration of the interval of survival of the "holes" is conventionally measured by the lifetime of the semiconductive material and depends upon such factors as the purity, uniformity and perfect crystallinity of the semiconductive body. While this lifetime is typically very short—e.g. tens or hundreds of microseconds—by limiting application of the etching potential to intervals in which "holes" still persist in sufficient quantity the desired type of etching is caused to take place in the etching interval. For example by using an alternating sinusoidal voltage between electrolyte and body in which the duration of the half-cycle for which the electrolyte is negative is comparable to or less than the lifetime for holes in the material, smooth, rapid etching limited to the region against which the electrolyte is applied is obtained without requiring the application of illumination or injection of minority carriers from special devices, and in many cases in which the electrolyte is applied in the form of a jet the definition or localization of the etching is also improved.

Other objects and features of the invention will become more apparent from a consideration of the following description taken in connection with the accompanying figures, in which.

Figure 1:
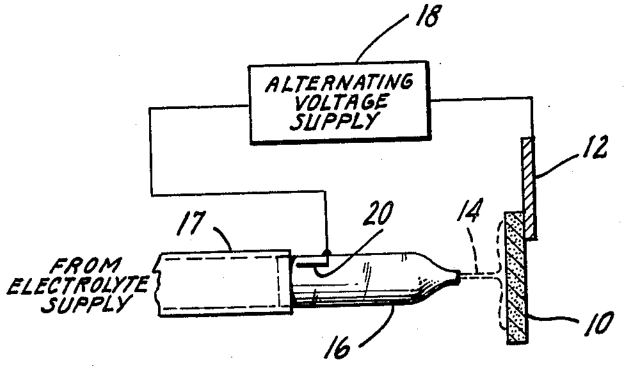
FIGURE 1 is a diagrammatic sectional view, partly in block form, illustrating one arrangement of apparatus suitable for practicing the method of the invention.

Referring now particularly to FIGURE 1, in one embodiment of the invention an N-type semiconductive body 10 of germanium or silicon in the form of a thin wafer and provided with an ohmically-affixed metal connection 12 is held so as to be impinged upon part of one major surface by a jet of electrolyte 14 issuing from a nozzle 16, which in turn is supplied with an electrolyte under suitable pressure in conventional manner from tubing 17. An alternating voltage supply 18 is connected between the metal connection 12 and an inert electrode 20 in the electrolyte so as to provide an alternating potential difference between the semi-conductive body 10 and the electrolytic jet 14. The jet 14 provides a rectifying contact to body 10 for injecting "holes" into the body when made positive by the applied voltage from supply 18, and provides etching of body 10 under the jet when the jet is made negative. No special illumination is required, and in fact the process may be practiced in darkness.

Figure 2:
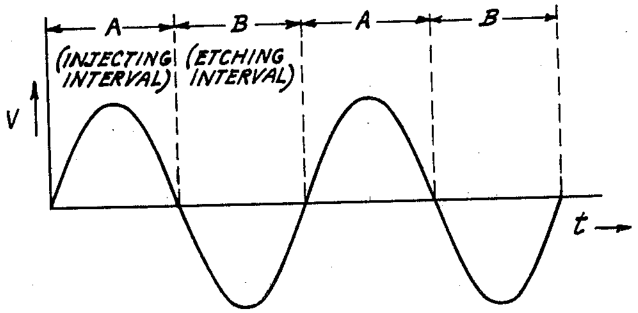
FIGURE 2 is a graphical representation showing a waveform of voltage which may be used in one embodiment of the invention, and to which reference will be made in explaining the principle of the invention.

In one form of the invention the alternating voltage supply may produce in jet 14 a potential variation with respect to ohmic connection 12, and hence with respect to the semiconductive body 10, having the form of an alternating sinusoid such as that shown in FIGURE 2. In the latter figure abscissae represent time while ordinates represent the magnitude of the instantaneous potential of electrode 20 and the adjacent electrolyte with respect to semiconductive body 10, positive values being measured above and negative values below the horizontal axis. It is understood that the exact form of the wave is not critical and the shape illustrated has been chosen for convenience in explanation. In a typical example in which the lifetime of "holes" in the semiconductor is about 50 microseconds the frequency of the sine wave shown in FIGURE 2 may be about 400 kc. per second and its amplitude of the order of several hundred volts, as determined by the particular current requirements for the etching operation to be performed.

With this arrangement rapid, smooth and well-defined etching of the semiconductive body beneath the jet 14 is produced despite the fact that the semiconductive body is of N-type material in which the concentration of excess "holes" required for such etching is normally very low and despite the fact that no illumination, or illumination less than that previously required for such etching, is applied. This is made possible by the fact that during positive half-cycles of the voltage applied to jet 14—i.e. during the intervals A in FIG. 2—the rectifying contact formed between body 10 and jet 14 is biased in the forward direction and hence injects "holes" into the semiconductive body impinged thereby. Each time the etching potential swings through the zero point such injection ceases, but a substantial percentage of the already-injected "holes" persist for an average interval which is comparable to or greater than the immediately-subsequent interval B during which the sine wave is of negative polarity. Preferably the lifetime of holes in the semiconductor is greater than the duration of the etching interval. In a typical case in which the frequency of the sinusoid is about 400 kc. per second the duration of each etching interval B is about 1¼ microseconds, and for a semiconductive body 10 having a "hole" lifetime of the order of 50 to 100 microseconds the necessary concentration of excess "holes" therefore persists without appreciable diminution throughout the etching interval. This same alternation between "hole" injection and etching repeats itself for each complete cycle of variation of the alternating supply voltage, so that in the etching half-cycles of the sine wave efficient, smooth and rapid etching is obtained.

Figure 3:
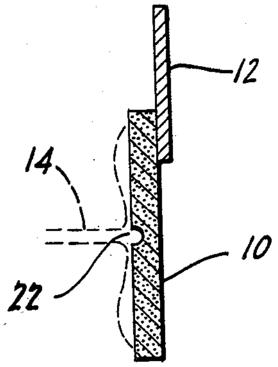
FIGURE 3 is an enlarged sectional view illustrating the form of a typical body of semiconductive material after treatment by the process of the invention.

FIGURE 3, wherein elements like those of FIG. 1 are indicated by like numerals, illustrates the general form of semiconductive body 10 typically existing after the etching has progressed into the body. The pit 22 formed therein under the jet is well-defined, has a diameter about equal to that of jet 14, has smooth surfaces and is produced with rapidity. To form a complete transistor a similar pit may be etched in similar manner in the portion of the surface directly opposite pit 22 and emitter and collector elements jet plated upon the bottoms of the opposed depressions. Body 10 then serves as the transistor base and connection 12 as the base connection.

While not intended to limit the scope of the invention the following are typical specific examples of operating conditions and parameters found useful in various cases.

In one set of examples of the process the semiconductive bodies were of N-type germanium having a resistivity in the range from 13 to 40 ohm centimeters and a "hole" lifetime of between 50 and 600 microseconds. The jet was 7 mils in diameter and of 7.5 Normal hydrofluoric acid, and was ejected with a pressure sufficient to produce a liquid flow of about 8 milliliters per minute. The surface etched was shielded from any ambient light so as to prevent variations in the etching due to photoelectric effects, and the amplitude of the sinusoid of applied voltage was such as to produce an R.M.S. current of 10 to 20 milliamperes through the jet. With an etching voltage frequency of 400 kc. per second the etching proceeded at a rate in excess of 2 mils, i.e. 0.002 inch, per minute leaving a smoothly polished, steep-sided pit. For semiconductive bodies in the upper part of the above range of lifetimes similar results were obtained with an etching-potential frequency of 5 kc. per second.

In other examples the semiconductive bodies were of N-type silicon having a resistivity in the range of 0.5 to 2 ohm centimeters and a lifetime of 10 to 50 microseconds. Using the same form and velocity of jet and the same frequency and current, but with an electrolyte of either 1.25 Normal potassium hydroxide or 2.3 Normal hydrofluoric acid plus 0.2 Normal nitric acid, etching at the rate of about 1 mil per minute with smooth surfaces was obtained.

In both of the cases of germanium and silicon mentioned above the pit obtained had a width at the surface which was about the same as the diameter of the jet, rather than much greater as is typically the case in jet-electrolytic etching of semiconductors. This feature of accurate definition of the etching is obviously highly advantageous in enabling one to delineate with greater accuracy the etched regions.

The nature of the electrolyte utilized in the case of germanium is not critical, most common aqueous electrolytic etching electrolytes being satisfactory for use on germanium. Similarly in the case of silicon, those electrolytes usually used for jet electrolytic etching of silicon, most of which contain fluoride ions to enhance the action, may be utilized also in the present invention.

By performing similar etching with different lifetimes of the semiconductive material and with different frequencies we have established that the relationship between the lifetime of the "holes" and the duration of the etching interval is important in obtaining the improved etching action described herein. Thus we have found that with conditions otherwise the same as described hereinbefore, but utilizing a direct voltage of negative polarity at electrode 20 in the jet, no useful etching is obtained in the case of N-type germanium and silicon. Using direct voltage the rates at which normal etching could be obtained were of the order of one hundredth of a mil per minute, and often numerous tiny, randomly-located etch pits were produced both immediately under and outside the area directly impinged by the jet. In contrast, using an alternating supply voltage having a frequency of 400 kc. per second, giving a duration for the negative half-cycle of applied potential of about 1¼ microseconds, and utilizing the above types of germanium and silicon in which the lifetimes are in excess of 5 microseconds, the above-mentioned smooth and well-defined etching at a rate of about 1 mil per minute was obtained. In addition we have found that if the surface of the semiconductor is physically abraded before the etching so as to reduce greatly the lifetime of the semiconductive body, then even with the 400 kc. per second alternating etching voltage the action obtained is like that with direct voltage—namely, no appreciable etching occurs in the case of N-type silicon and substantially no etching of the surface of the semiconductor occurs in the case of N-type germanium.

While we have thus far described the invention particularly with relation to use of a sine wave of alternating voltage it will be obvious to one skilled in the art that other forms of applied potential may be utilized as well. For example rectangular pulses of alternately positive and negative potential may be utilized, and the respective durations of the positive and negative parts of the cycle may be adjusted with respect to each other to obtain maximum efficiency for the particular application. Similarly where a sinusoid of alternating voltage is utilized a controllable direct-voltage component may be added to the sinusoid applied between jet and body so as to enable control of the respective amplitudes of the positive and negative half-cycles as well as the durations thereof. In all of these cases the important consideration is that the etching portion of the cycle should be made sufficiently short that a sufficient quantity of injected "holes" persists in the body in each etching interval, as will occur when the lifetime of the material is comparable to or greater than this etching interval.

Further, while the invention has been described with particular reference to jet-electrolytic etching with which it is preferably employed it may also be applied to the etching of N-type semiconductive bodies immersed in a bath of electrolyte with appropriate masking to define a localized area in which the electrolyte contacts the semiconductor. In such cases suitable agitation of the electrolyte in the vicinity of the semiconductor is preferably provided so as to remove rapidly the products of the reaction from the vicinity of the region to be etched.

In addition the method may be employed advantageously even in the presence of light in order to realize a higher rate of etching and the better-localized, steeper-sided etch pits typically produced by the method.

While the invention has been described with specific reference to particular embodiments thereof it will be understood that it may be embodied in any of a variety of forms differing substantially from those specifically described without departing from the scope of the invention as defined by the appended claims.

We claim:

1. The method of electrolytically etching a body of N-type semiconductive material comprising applying to said body an electrolytic etchant forming with said body a rectifying connection which is responsive to the application of positive potential to said electrolyte with respect to said body to inject minority carriers into said body, and applying to said electrolyte a potential variation of alternating polarity with respect to said body, the durations of successive intervals in which said potential variation maintains said electrolyte negative to said body being substantially equal to or less than the minority-carrier lifetime characteristic of said material such that smooth and rapid etching is produced during said intervals.

2. The method of etching a body of N-type semiconductive material of germanium or silicon or the like, comprising directing against said body a jet of an electroyltic etchant which forms with said body a first contact responsive to positive potentials applied to said jet with respect to said body to inject holes into said body and responsive to negative potentials applied to said jet with respect to said body to produce electrolytic etching of said body in the presence of a sufficient concentration of holes in the adjacent portion of said body, applying to said body a second contact of such nature and location that current reaching said first contact from said second contact in response to positive voltage of said second contact with respect to said first contact consists primarily of majority carriers, and applying to said jet a potential positive to said second contact during two successive time-spaced intervals and negative to said second contact in an intervening interval between said time-spaced intervals, the duration of said intervening interval being sufficiently short that at least some of the holes injected into said body by said jet during the first of said time-spaced intervals persist throughout substantially the entire duration of said intervening interval.

3. The method of etching a body of N-type semiconductive material of the class comprising germanium and silicon, said method comprising the steps of applying to a restricted portion of said body a jet of an electrolyte forming with said body a first contact which injects holes into said body when positive to said body and which when negative to said body and in the presence of a sufficient concentration of holes in the adjacent portion of said body electrolytically etches said body, applying to said body a substantially ohmic second contact, and applying to said jet a periodic alternating potential with respect to said second contact which has substantially equal positive and negative half-cycles, the frequency of said alternating potential being sufficiently high that each negative half-cycle thereof is at least as short as the lifetime of holes in said body portion.

4. The method of electrolytically etching a body of N-type semiconductive material comprising applying to a restricted portion of said body an electrolytic etchant forming with said body a rectifying connection which is responsive to the application of positive potential to said electrolyte with respect to said body to inject hole-type carriers into said body, applying to said body a substantially ohmic second contact and applying to said electrolyte an alternately positive and negative potential with respect to said second contact, the illumination of said body being less than that required to produce substantial etching by said negative potential in the absence of said positive potential, the duration of each negative potential interval being substantially equal to or less than the lifetime for holes in said material such that holes injected by said positive potential cause said negative potential to produce smooth etching of said body at a rate many times greater than that produced by said negative potential in the absence of said injected holes.

5. The method of claim 4 in which said electrolyte is applied in the form of a jet.

6. The method of claim 4 in which said material has a hole life-time of at least about 50 microseconds and the frequency of said alternating potential is at least as great as about 400 kilocycles per second.

7. The method of claim 4 in which said body is of germanium.

8. The method of claim 4 in which said body is of silicon.

9. The method of claim 4 in which said material has a hole life-time of at least about 600 microseconds and the frequency of said alternating potential is at least about 5 kilocycles per second.

References Cited by the Examiner

UNITED STATES PATENTS

| | | | |
|---|---|---|---|
| 2,656,496 | 10/53 | Sparks | 204—143 |
| 2,669,692 | 2/54 | Pearson | 204—143 |
| 2,876,184 | 3/59 | Geppert | 204—143 |
| 2,912,371 | 11/59 | Early | 204—143 |

FOREIGN PATENTS

| | | |
|---|---|---|
| 204,850 | 5/55 | Australia. |

JOHN H. MACK, *Primary Examiner.*